United States Patent [19]
Folk

[11] Patent Number: 6,049,138
[45] Date of Patent: Apr. 11, 2000

[54] AXLE-MOUNTED ELECTRICAL POWER DEVICE HAVING AN IMPROVED DRIVE COUPLING

[75] Inventor: Kenneth Foster Folk, Harrisburg, Pa.

[73] Assignee: The Whitaker Corporation, Wilmington, Del.

[21] Appl. No.: 09/120,483

[22] Filed: Jul. 22, 1998

[51] Int. Cl.[7] .................................................. B61F 5/50
[52] U.S. Cl. ............................................ 290/3; 105/157.1
[58] Field of Search ................................... 290/1 R, 1 A, 290/1 C, 3, 17; 322/20; 310/168; 105/157.1, 96.1

[56] References Cited

U.S. PATENT DOCUMENTS

| | | | |
|---|---|---|---|
| 2,806,149 | 9/1957 | Lillquist | 290/17 |
| 3,317,765 | 5/1967 | Cone | 310/74 |
| 3,911,301 | 10/1975 | Riley | 310/111 |
| 3,930,201 | 12/1975 | Ackermann et al. | 328/1 |
| 3,978,357 | 8/1976 | Voelbel et al. | 310/168 |
| 4,107,561 | 8/1978 | Schmidt | 310/95 |
| 4,165,466 | 8/1979 | Stikkers | 290/3 |
| 4,529,933 | 7/1985 | Bleeke | 324/173 |
| 4,553,723 | 11/1985 | Nichols et al. | 246/167 R |
| 4,658,168 | 4/1987 | Belart et al. | 310/168 |
| 4,700,133 | 10/1987 | Day | 324/208 |
| 4,797,611 | 1/1989 | Schreiber | 324/208 |
| 4,940,937 | 7/1990 | Hattori et al. | 324/207.22 |
| 4,964,345 | 10/1990 | Porel | 105/96.1 |
| 4,998,084 | 3/1991 | Alff | 335/306 |
| 5,079,468 | 1/1992 | Sata | 310/168 |
| 5,223,760 | 6/1993 | Peck et al. | 310/168 |
| 5,267,473 | 12/1993 | Bezos et al. | 73/129 |
| 5,488,287 | 1/1996 | Kemner et al. | 322/20 |
| 5,508,608 | 4/1996 | Goossens | 324/174 |
| 5,523,680 | 6/1996 | Sumi | 324/174 |
| 5,753,987 | 5/1998 | Shepherd et al. | 310/75 R |
| 5,775,229 | 7/1998 | Folk et al. | 105/157.1 |
| 5,828,135 | 10/1998 | Barrett | 290/3 |
| 5,915,306 | 6/1999 | Langhorst et al. | 105/157.1 |

FOREIGN PATENT DOCUMENTS

| 449538 A1 | 2/1991 | European Pat. Off. | H02K 21/14 |
|---|---|---|---|

OTHER PUBLICATIONS

Article, "Topologies for a Permanent Magnet Generator/Speed Sensor for the ABS on Railway Freight Vehicles"; Chaaban, Birch, Howe and Mellor; pp. 31–35. (source and date unknown).

U. S. Patent Application Serial No. 09/050,818 filed Mar. 30, 1998; (Abstract and Drawings only included).

*Primary Examiner*—Nicholas Ponomarenko

[57] ABSTRACT

An electrical power device (30) for mounting on a vehicle includes a drive coupling (44, 100, 120) for rotationally coupling the rotor (46) of the power device to the axle and wheel assembly (12) of the vehicle. The drive coupling includes a drive shaft (60, 122) having a portion extending outwardly into proximity with a projection (48) on the vehicle axle. A crank arm (74, 128) extends from the drive shaft for engaging the projection so that when the axle is rotated, the projection engages the crank arm and thereby rotates the drive shaft of the power device.

27 Claims, 7 Drawing Sheets

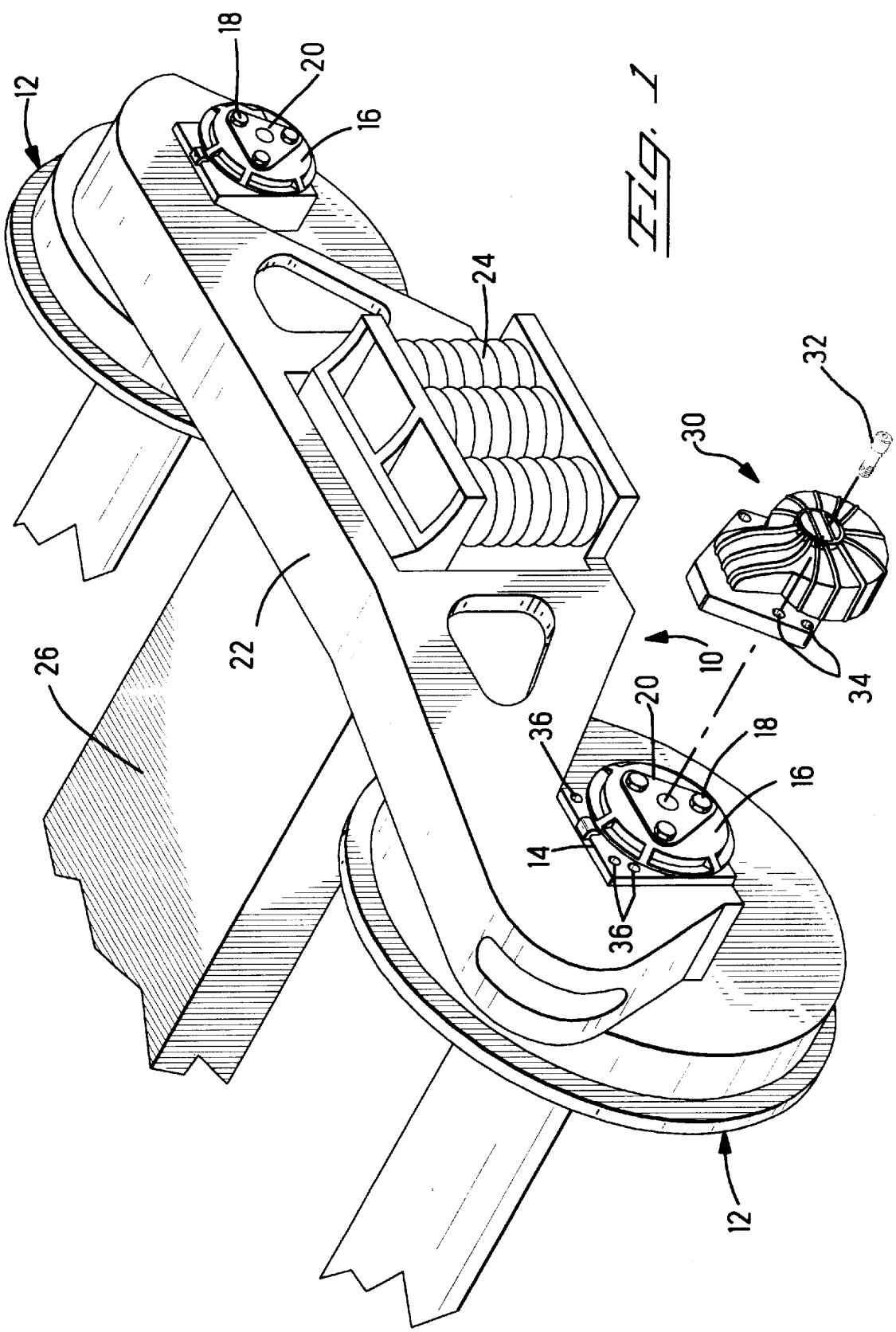

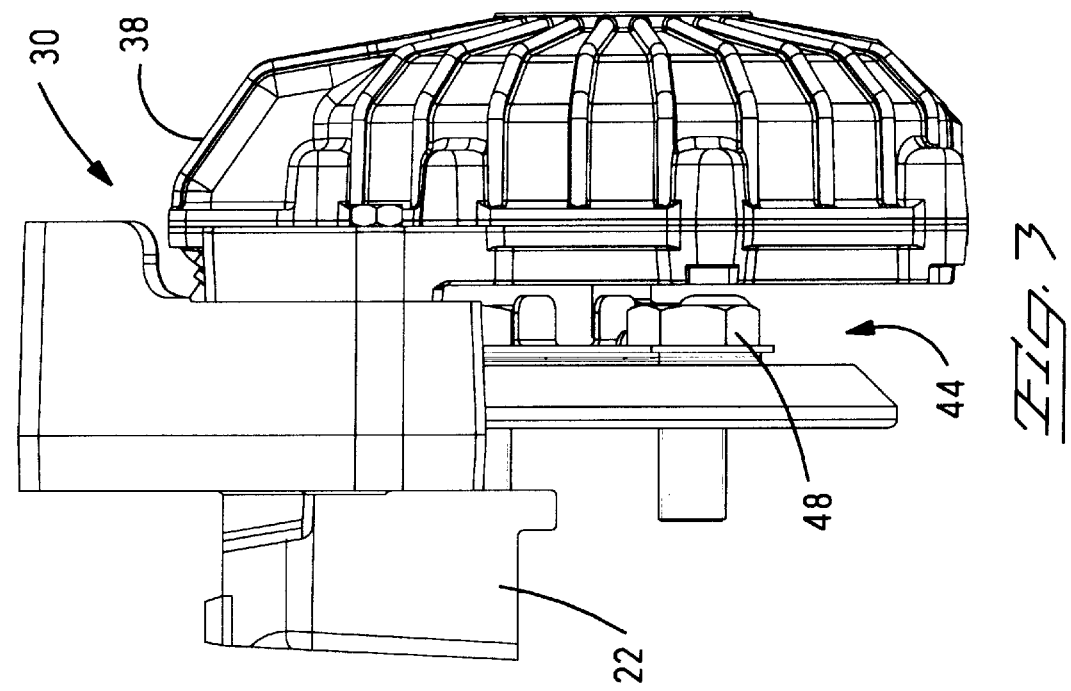
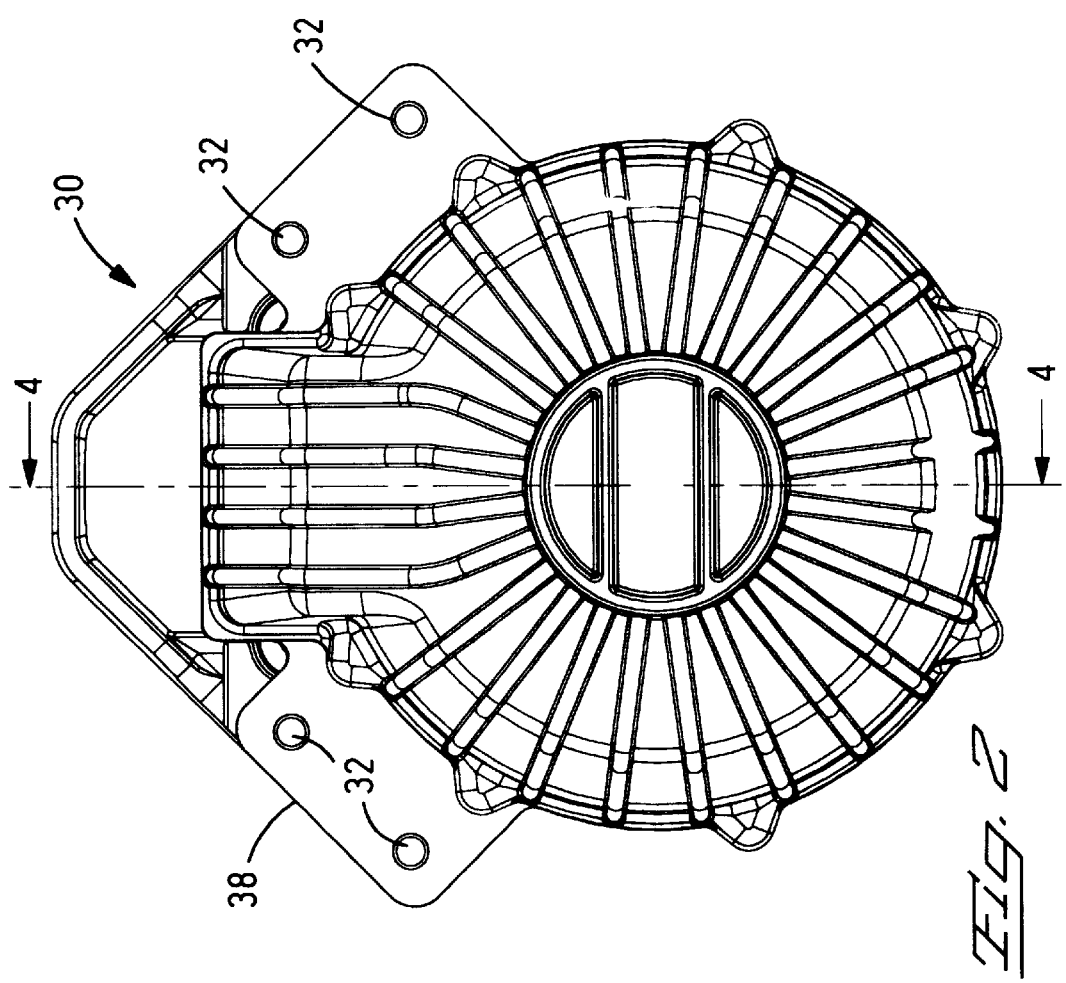

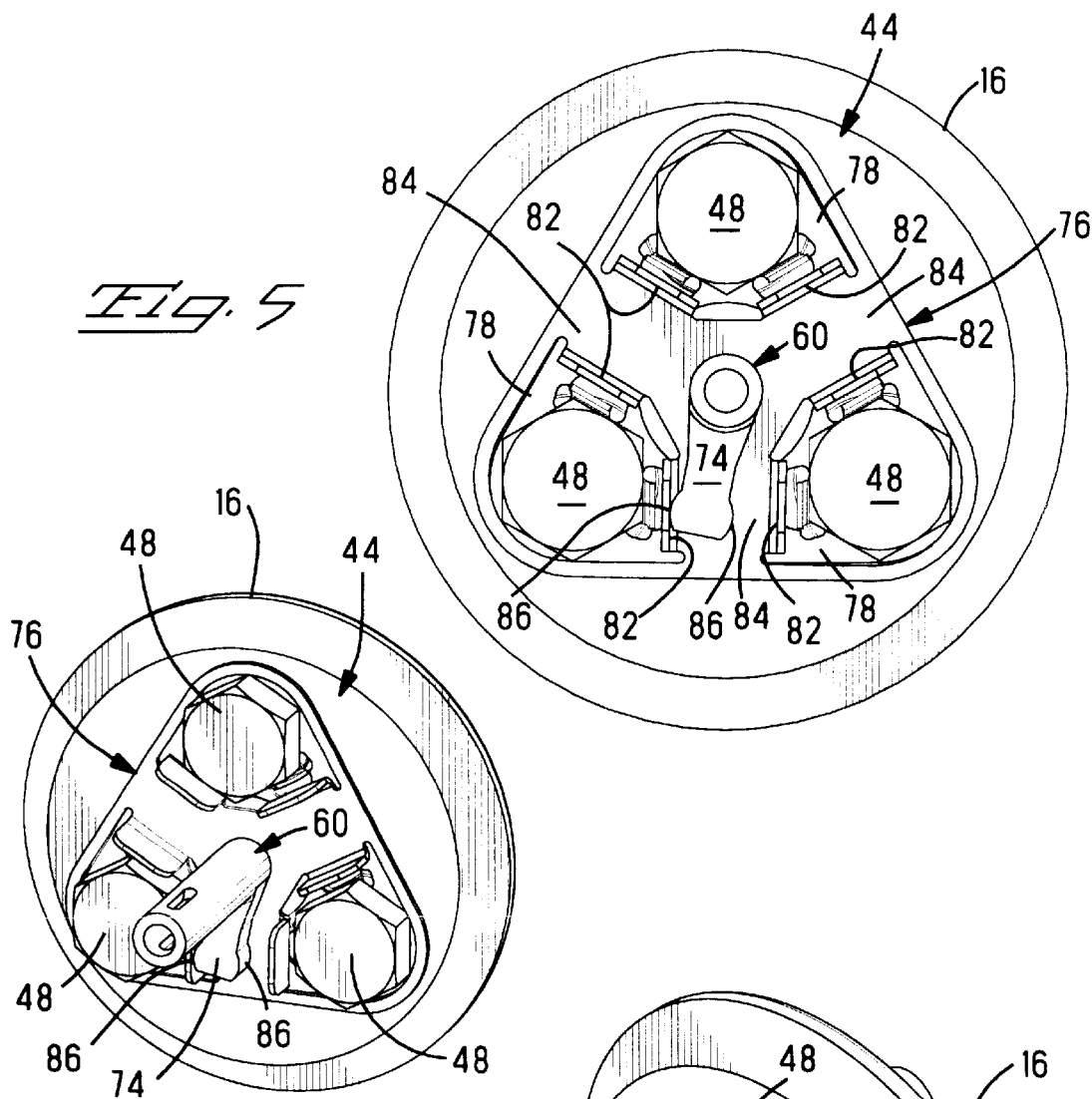
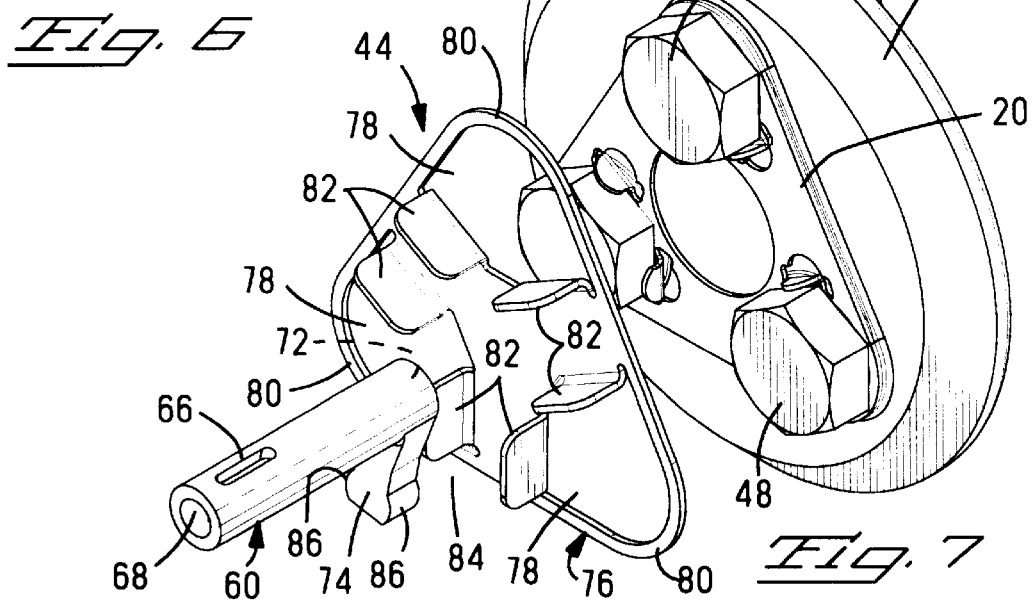

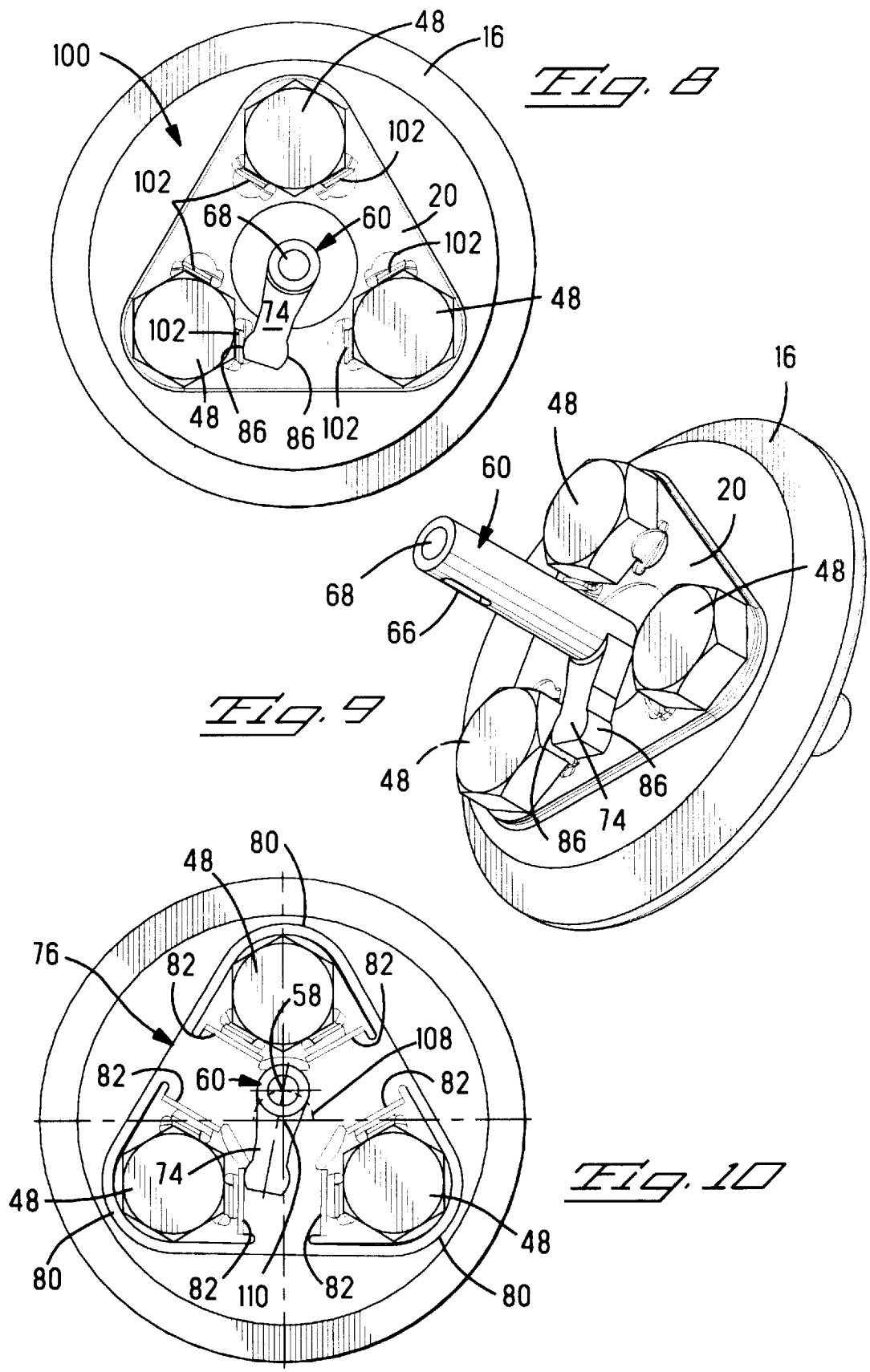

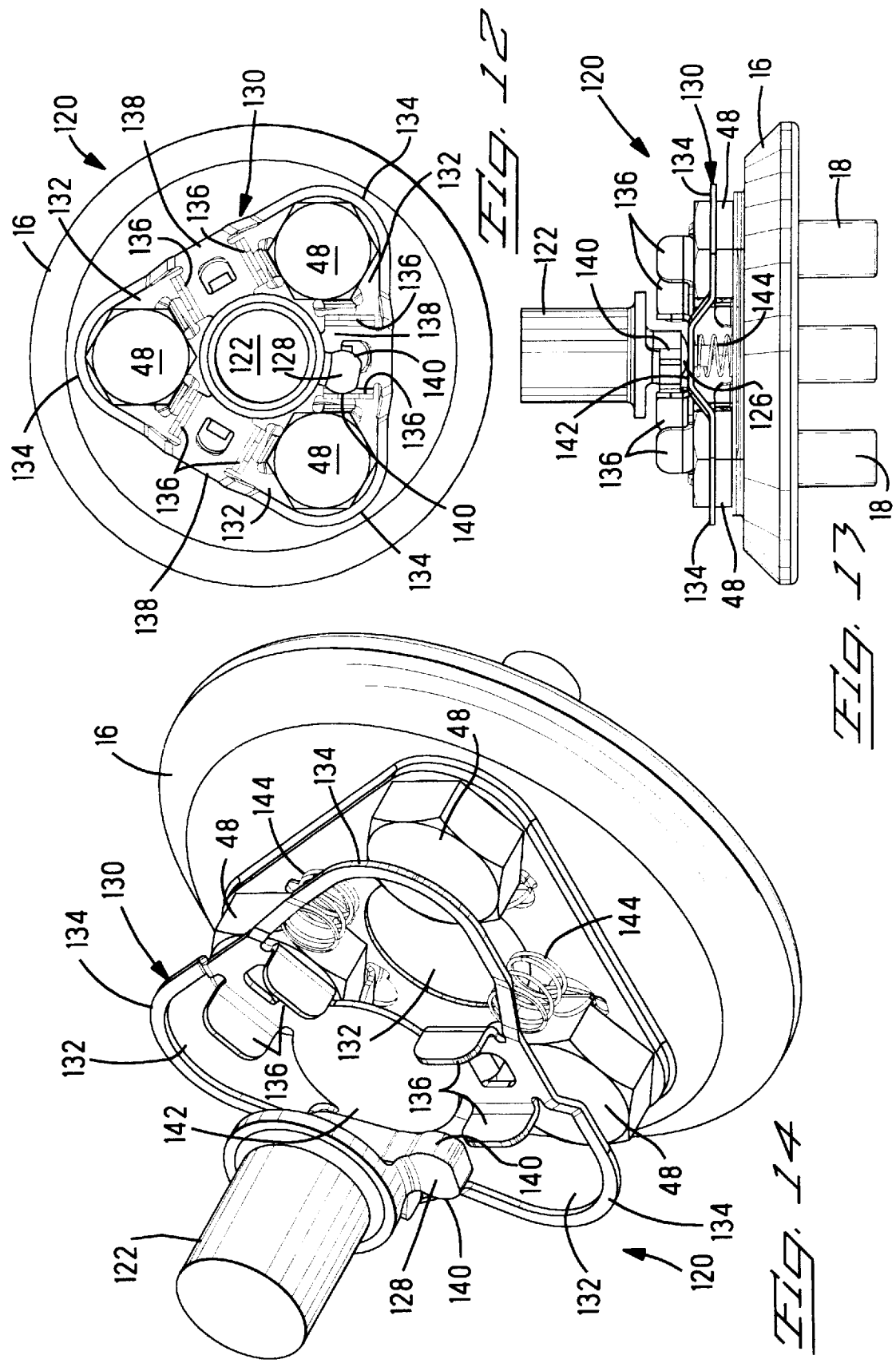

AXLE-MOUNTED ELECTRICAL POWER DEVICE HAVING AN IMPROVED DRIVE COUPLING

The present invention is related to power devices attached to and carried by a vehicle, and more particularly to such a device having a drive coupling for rotationally coupling the axle of the vehicle to the rotor of the power device.

BACKGROUND OF THE INVENTION

Electrical energy is sometimes generated by attaching a generator or alternator to the frame of a vehicle and coupling the rotor of the device to the axle of the vehicle. As the vehicle axle rotates the device rotor also rotates thereby generating the desired electrical energy. Such power generating devices are used in the railroad industry and take many different forms. A serious objection to most of these devices is that they are coupled to the railroad car axle in such a way that the bearing end cap of the axle must be either temporarily removed and replaced or a different end cap substituted. The reason that this is undesirable is that this disturbs the axle bearing when removing the bearing end cap and requires the skill of a workman that is specifically trained in this procedure requiring resources and equipment normally found in central work shops necessitating sending each railroad car that is to be retrofitted with one of these power generating devices to the central work shop for installation. It is, therefore, desirable to couple the power generating device to the railroad car axle without disturbing the bearing end cap so that the installation can be accomplished in the field thereby reducing service disruptions and equipment requirements.

A power generating device and axle coupling of the related art is disclosed in French patent number FR2 624 818. This device is secured to the truck of the railroad car by means of bolts that are threaded into the vehicle frame. The rotor of the device has a drive shaft that is held in alignment with the vehicle axle. A coupling disc having three circular cutouts formed in its periphery is attached to the end of the drive shaft so that the three bolts holding the bearing end cap in place are positioned so that each of their heads is located within one of the three cutouts. As the vehicle axle rotates, the bolt heads engage the edges of the cutouts and cause the coupling disc and attached drive shaft to rotate. Due to the somewhat loose coupling of the railroad car frame to the vehicle axle, the car is permitted to move relative to the axle during normal operation. This movement can be up to 0.5 inch in all directions perpendicular to the axle and up to 0.25 inch in the axial direction. As a result of this rather substantial amount of possible relative movement, the coupling disc can be jammed against one of the bolt heads thereby damaging the coupling disc or the bolt head, or the coupling disc can completely disengage the three bolt heads causing the device to become inoperable.

What is needed is a coupling that can engage one or more of the bolt heads for driving the rotor of the alternator while having the ability to accommodate the possible extreme lateral and axial movement of the car with respect to the axle.

SUMMARY OF THE INVENTION

An electrical power device is disclosed for mounting on a vehicle. The vehicle has an axle rotationally coupled to a frame of the vehicle for rotation about an axis. The axle includes a projection extending therefrom. The electrical power device has a stator and a mating rotor. A drive coupling is attached to the rotor for rotationally coupling the rotor to the axle. The drive coupling includes a drive shaft having a portion extending outwardly from the electrical power device into proximity with the projection of the axle. A crank arm is attached to the portion of the drive shaft and includes a single abutting surface for engaging the projection so that when the axle is rotated about the axis, the projection engages the single abutting surface and thereby rotates the drive shaft. A drive plate may be included having a member interposed between the abutting surface and the projection. The drive plate is arranged so that when the axle is rotated about the axis, the projection engages the member thereby causing the member to engage the abutting surface thereby rotating the drive shaft.

An embodiment of the invention will now be described by way of example with reference to the following drawings.

DESCRIPTION OF THE FIGURES

FIG. 1 is an isometric view of a vehicle showing an alternator incorporating the teachings of the present invention;

FIGS. 2 and 3 are front and side views, respectively, of the alternator shown in FIG. 1;

FIG. 5 is a front view of a first embodiment drive coupling interconnecting the alternator of FIG. 1 to the vehicle;

FIG. 6 is an isometric view of the first drive coupling shown in FIG. 5;

FIG. 7 is an exploded parts view of the first drive coupling shown in FIG. 5;

FIG. 8 is a front view of a second embodiment drive coupling interconnecting the alternator of FIG. 1 to the vehicle;

FIG. 9 is an isometric view of the second drive coupling shown in FIG. 8;

FIG. 10 is a front view of the first drive coupling shown in FIG. 5 showing the drive shaft displaced with respect to the vehicle axle;

FIG. 12 is a front view of the third drive coupling shown in FIG. 11;

FIG. 13 is a side view of the third drive coupling shown in FIG. 11; and

FIG. 14 is an exploded parts view of the third drive coupling shown in FIG. 11.

DESCRIPTION OF AN EMBODIMENT OF THE INVENTION

Figure 4:
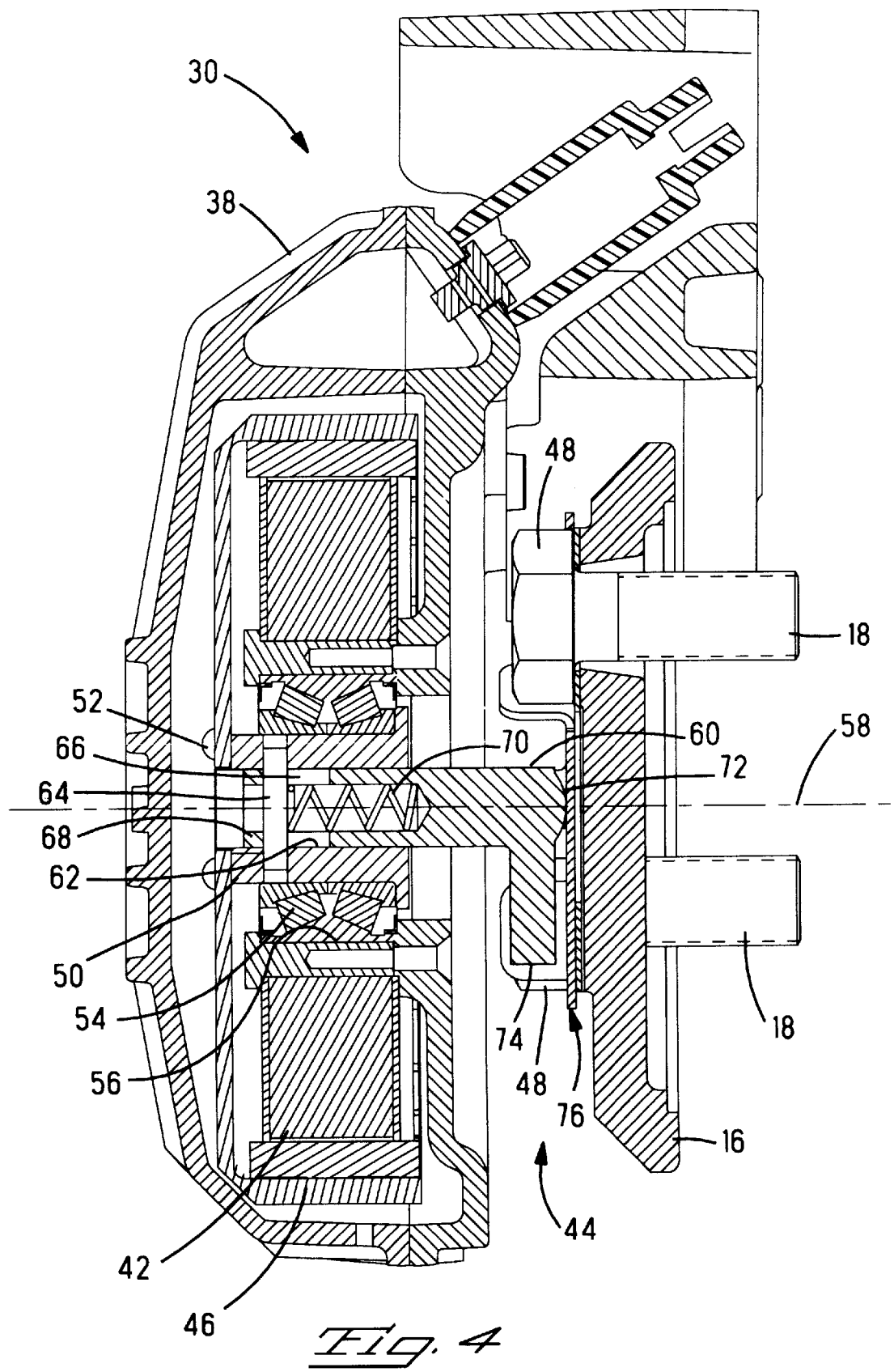
FIG. 4 is a cross-sectional view taken along the lines 4—4 in FIG. 2.

FIGS. 1–3 show a railroad car truck assembly 10 which includes a rotatable axle and wheel assembly 12. The axle is received for rotation in a bearing adapter block 14. The bearing adapter block 14 includes a standard bearing end cap 16 for retaining the axle bearing assembly in place. The end cap 16 is bolted to the end of the axle by means of bolts 18 in the usual manner. A washer plate 20 having locking tabs is provided to lock the bolts 18 in place. The bearing adapter block supports a truck side frame 22 so that the axle and wheel assembly 12 rotates freely relative to the truck side frame 22. The truck side frame 22 supports suspension springs 24 which, in turn, support a bolster 26. The bolster 26 comprises an integral part of a rail car, for example, a box car or flat car (not shown). An alternator 30 is rigidly attached to the adapter block 14 by means of bolts 32 that extend through clearance holes 34 provided in a frame 38 of the alternator and into corresponding threaded holes 36 in the adapter block 14.

As best seen in FIGS. 3 and 4, the alternator 30 includes a first drive coupling 44 that rotationally couples a rotor 46 of the alternator to the bearing end cap 16 of the axle and wheel assembly 12. The rotor 46 interacts with a stator 42 to generate the desired power in the usual manner. The first drive coupling actually engages the heads 48 of the bolts 18 to effect the rotational coupling, as will be explained. The rotor 46 of the alternator 30 is attached to a hub or hollow shaft 50 by means of screws 52 which are threaded into holes provided in the hollow shaft 50. The hollow shaft 50 has a snug fit with an inner race of a bearing 54 which is retained in a bore 56 formed in the frame 38 so that the hollow shaft 50 is free to rotate. The first drive coupling 44 includes a drive shaft 60 having an axis 58 and an outer diameter that has a sliding fit with a central bore 62 of the hollow shaft 50. A pin 64 extends through holes in the walls of the hollow shaft, intersecting the bore 62. The pin 64 also extends through an elongated hole 66 formed through the drive shaft 60 so that the drive shaft is free to slide axially within the bore 62 but is rotationally coupled to the hollow shaft by the pin 64. The drive shaft 60 includes an axially formed blind hole 68 containing a compression spring 70 having one end against the pin 64 and the other end against the bottom of the blind hole thereby urging the drive shaft toward the right, as viewed in FIG. 4. The drive shaft 60 includes a spherical end 72 and a crank arm 74 extending from the drive shaft at right angles thereto.

As best seen in FIGS. 5, 6, and 7, the first drive coupling further includes a drive plate 76 having three equally spaced openings 78 forming radiussed sections 80 (FIG. 7). A pair of drive members or tabs 82 are bent outwardly from the drive plate adjacent each opening 78. The drive tabs 82 are perpendicular to the drive plate and opposing tabs of adjacent openings 78 are mutually parallel. As best seen in FIGS. 4–7, the crank arm 74 extends into a space 84 between an opposing pair of drive tabs 82. It will be understood that each of the three pairs of opposing drive tabs 82 has a similarly sized space 84 therebetween. The end of the crank arm 74 includes a single radiussed portion 86 on each side for actual engagement with the drive tabs to minimize gouging of the tabs and to provide a smooth drive coupling. The drive tabs 82 prevent direct contact between the crank arm 74 and the bolt heads 48, minimizing or even eliminating possible wear of the bolt heads. The openings 78 are sized so that the bolt heads 48 extend freely into the openings and the radiussed sections 80 closely engage outer surfaces of the three bolt heads with little rotational play. The compression spring 70 urges the drive shaft 60 toward the drive plate 76 so that the spherical end 72 is maintained in engagement with the drive plate, thereby urging the drive plate against the washer plate 20, as shown in FIG. 4. The drive plate 76 freely floats between the end of the drive shaft and the bearing end cap, and is retained in operating position, as shown in FIG. 4, solely by the proximity of the drive shaft 60 to the bearing end cap 16 and by the bolt heads 48 extending into the openings 78.

A second drive coupling 100, as best seen in FIGS. 8 and 9, omits the drive plate 76 of the first drive coupling 44, but is otherwise identical thereto. In this second drive coupling the radiussed portions 86 of the crank arm 74 directly engage the bolt heads 48 or locking tabs 102 that may be bent upwardly from the washer plate 20. According to this embodiment, the compression spring 70 urges the spherical end 72 of the drive shaft 60 into engagement with the surface of the bearing end cap 16, if a central hole is present in the washer plate. Otherwise the spherical end 72 engages the outer surface of the washer plate. In any case, the crank arm 74 is maintained between two adjacent bolt heads 48.

The drive shaft 60 is sized so that there may be relative lateral movement of approximately one half inch between the drive shaft and the bearing end cap 16. This lateral movement is substantially perpendicular to the axis of the vehicle axle and commonly occurs during normal operation of a typical railroad car. The reason that this movement occurs is due to the basic construction of railroad cars in which the car, the truck side frame 22, frame 26, and the axle and wheel assembly 12 are held in operational position only while the vehicle is in an upright position. That is, the separate parts are nested together and held in their relative positions only by gravity. Therefor, during operation of the vehicle several factors may cause such relative lateral motion to occur, including uneven tracks or jolting caused when two or more cars are joined together.

As shown in FIG. 10, a semicircle 108 having a one-half inch radius is drawn about an axis 110, which represents the axis of rotation of the axle and wheel assembly 12. The semicircle 108 representing the outer limit of permitted relative lateral movement of the parts. The axis 58 of the drive shaft 60 may occupy any position within the semicircle 108 without the drive shaft or the crank arm 74 interfering with any portion of the drive plate 76, the bolt heads 48, or the bearing end cap 16. In the example shown in FIG. 10, the drive shaft 60 is shown in its maximum upward position relative to the bearing end cap 16 while the radiussed portions 86 of the crank arm 74 remain in coupled contact with a drive tab 82. This coupled contact of the radiussed portion 86 and a drive tab 82 will be maintained as long as the two axes 58 and 110 are not mutually displaced more than about one half inch. Therefor, during normal operation of the vehicle, as long as the relative lateral displacement of the two axes 58 and 110 remain within 0.5 inch, there should be no binding or abnormal interference between the parts and the drive shaft 60 will remain rotationally coupled to the axle and wheel assembly 12. Additionally, the axle and wheel assembly 12 may undergo a small amount of axial movement toward and away from the alternator 30 during normal operation. This movement is accommodated by the drive shaft 60 sliding axially within the bore 62. The compression spring 70 maintains the spherical end 72 of the drive shaft in engagement with the drive plate 76 or, in the case of the second drive coupling 100 the spherical end is maintained in engagement with an outer surface of the bearing end cap 16. Therefore, as the axle and wheel assembly 12 undergoes axial movement, the drive coupling is maintained in rotational engagement with the axle and wheel assembly.

A third drive coupling 120 that rotationally couples a rotor 46 of the alternator to the bearing end cap 16 of the axle and wheel assembly 12 is shown in FIGS. 11 through 14. The third drive coupling 120 includes a drive shaft 122 having an axis 118 and an outer diameter 124 that has a snug fit with an inner race of the bearing 54 so that the drive shaft is free to rotate. The rotor 46 of the alternator 30 is attached to the end of the drive shaft 122, instead of the hollow shaft 50 in the case of the first drive coupling 44, by means of screws 52 which are threaded into holes in the drive shaft. The drive shaft 122 includes a spherical end 126 and a crank arm 128 extending from the drive shaft at right angles thereto.

Figure 11:
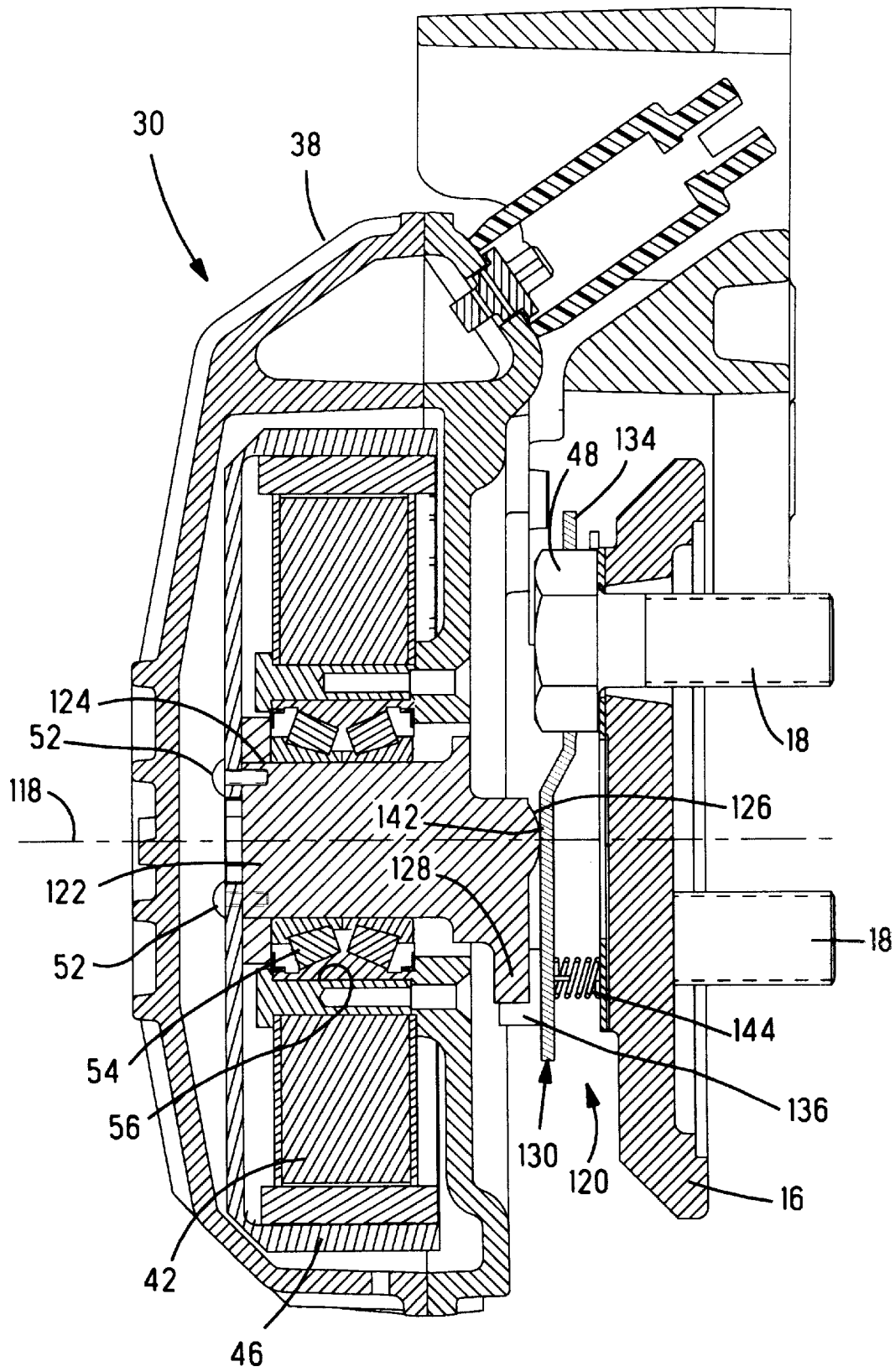
FIG. 11 is a cross-sectional view similar to that of FIG. 4 showing a third embodiment drive coupling interconnecting the alternator of FIG. 1 to the vehicle.

As best seen in FIGS. 12, 13, and 14, the third drive coupling further includes a drive plate 130 having three equally spaced openings 132 forming radiussed sections 134. A pair of drive members or tabs 136 are bent outwardly from the drive plate adjacent each opening 132. The drive tabs 136 are perpendicular to the drive plate and opposing tabs of adjacent openings 132 are mutually parallel. As best seen in FIGS. 11, 12, and 13, the crank arm 128 extends into a space 138 between an opposing pair of drive tabs 136. It will be understood that each of the three pairs of opposing drive tabs has a similarly sized space 138 therebetween. The crank arm 128 includes a radiussed portion 140 on each side for actual engagement with the drive tabs 136 to minimize gouging of the tabs and to provide a smooth drive coupling. The drive tabs 136 prevent direct contact between the crank arm 128 and the bolt heads 48, thereby minimizing or even eliminating a possible wear of the bolt heads. The openings 132 are sized so that the bolt heads 48 extend freely into the openings and the radiussed sections 134 closely engage outer surfaces of the three bolt heads with little rotational play. As best seen in FIGS. 13 and 14, the radiussed sections 134 are offset from the general plane of the drive plate 130 in a direction toward the bearing end cap 16. The amount of offset is chosen so that when the drive plate 130 is in its nominal position, as shown in FIGS. 11 and 13, the spherical end 126 engages the central portion 142 of the drive plate and the radiussed sections 134 are positioned about midway along the length of the bolt heads 48. Three compression springs 144 are arranged between the bearing end cap 16 and the underside of the drive plate 130 to maintain the drive plat in engagement with the spherical end 126. As set forth above, the axle and wheel assembly 12 may undergo about 0.25 inch of axial movement toward and away from the alternator 30 during normal operation. This axial movement is accommodated by the drive plate 130 moving axially with respect to the axle and wheel assembly 12 and compressing or expanding the springs 144. During this axial movement the bolt heads 48 extend further or less into the openings 132 while the radiussed sections 134 remain in driven engagement with the bolt heads. The springs 144 maintain the spherical end 126 of the drive shaft in engagement with the drive plate. Therefore, as the axle and wheel assembly 12 undergoes axial movement, the drive coupling is maintained in rotational engagement with the axle and wheel assembly.

Additionally, and with reference to FIG. 13, the entire drive shaft 122 and crank arm 128 are positioned axially further away from the bearing end cap 16 than are the bolt heads 48 so that as the vehicle undergoes relative lateral movement between the drive shaft and the bearing end cap, the drive shaft and crank arm will clear the bolt heads. There will be no interference and the drive shaft will remain rotationally coupled to the axle and wheel assembly 12. The drive plate 130 freely floats between the end of the drive shaft 124 and the bearing end cap 16, and is retained in operating position, as shown in FIG. 11, solely by the proximity of the drive shaft to the bearing end cap and by the bolt heads 48 extending into the openings 132.

While the drive coupling of the present invention is described as engaging the heads 48 of the bolts 18 which secure the bearing end cap 16 to the axle and wheel assembly 12, it will be understood that the teachings of the present invention may be practiced by providing engagement means other than the bolt heads. That is, the drive coupling may engage one or more other suitable projections extending from the axle or the bearing end cap.

An important advantage of the present invention is that the drive coupling can engage one or more of the bolt heads for driving the rotor of the alternator while having the ability to accommodate the possible extreme lateral and axial movements of the car with respect to the axle. Another important advantage of an embodiment of the present invention is that the bolt heads of the axle and wheel assembly are protected from excess wear by the drive tabs of the drive plate. Additionally, the present couplings can be installed on the vehicle without removal of the bearing end cap and without disturbing the bearing.

What is claimed is:

1. In an electrical power device for mounting on a vehicle having an axle rotationally coupled to a frame of said vehicle for rotation about an axis, said axle having a projection extending therefrom, wherein said electrical power device has a frame, a stator attached to said frame, and a rotor arranged for rotation in said frame, a drive coupling attached to said rotor for rotationally coupling said rotor to said axle comprising:

a drive shaft having a portion extending outwardly from said electrical power device into proximity with said projection;

a crank arm attached to said portion of said drive shaft, said crank arm having at least one abutting member for engaging said projection so that when said axle is rotated about said axis, said projection engages said abutting member and thereby rotates said drive shaft.

2. The electrical power device according to claim 1 wherein said drive shaft is arranged to undergo sliding motion, with respect to said rotor, toward and away from said axle, including a spring for urging said drive shaft toward said axle.

3. The electrical power device according to claim 1 wherein said projection extends from said end of said axle, and wherein said portion of said drive shaft is spaced from said projection an amount sufficient to accommodate substantial relative movement between said axle and said vehicle frame while maintaining said rotational coupling between said crank arm and said axle.

4. The electrical power device according to claim 3 wherein said portion of said drive shaft is in substantial alignment with said axis of said axle.

5. The electrical power device according to claim 4 wherein said rotor includes a hollow shaft having an axially arranged bore and said drive shaft is slidingly received within said bore to permit relative sliding motion therebetween.

6. The electrical power device according to claim 5 including an elongated opening in said drive shaft and a pin extending from said hub into said elongated opening to rotationally couple said drive shaft to said hub while permitting said sliding motion.

7. The electrical power device according to claim 6 wherein said portion of said drive shaft is urged into proximity with said end of said axle by a spring.

8. The electrical power device according to claim 1 characterized by a drive plate disposed between said portion of said drive shaft and said axle end, wherein a spring urges said portion and said drive plate into mutual engagement.

9. In an electrical power device for mounting on a vehicle having an axle rotationally coupled to a frame of said vehicle for rotation about an axis, said axle having a projection extending therefrom, wherein said electrical power device has a frame, a stator attached to said frame, and a rotor arranged for rotation with respect to said frame, a drive coupling attached to said rotor for rotationally coupling said rotor to said axle comprising:

a drive shaft having a portion extending outwardly from said electrical power device;

a crank arm attached to said portion of said drive shaft having an abutting member disposed in proximity to said projection of said axle;

a drive plate having a drive member adjacent said abutting member, said drive plate being arranged so that when said axle is rotated about said axis, said projection engages said drive plate and thereby rotates said drive plate, causing said drive member to engage said abutting member and rotate said drive shaft.

10. The electrical power device according to claim 9 wherein said portion of said drive shaft is urged into engagement with said drive plate thereby urging said drive plate into engagement with said axle.

11. The electrical power device according to claim 10 wherein said projection is on an end of said axle and said drive shaft is substantially parallel to and in approximate alignment with said axis.

12. The electrical power device according to claim 11 wherein said drive plate includes an opening into which said projection extends, said drive plate being disposed substantially perpendicular to said axis and said drive member being at right angles to said drive plate.

13. The electrical power device according to claim 12 wherein said drive plate is freely floating between said end of said axle and said crank arm and is retained there solely by the proximity of said drive shaft to said end of said axle and by said projection extending into said opening.

14. The electrical power device according to claim 9 wherein said electrical power device is attached to said vehicle frame and wherein said projection includes three projections equiangularly spaced about said axis, and said drive plate includes three openings, each projection extending into a respective one said opening.

15. The electrical power device according to claim 14 wherein said drive shaft and crank arm are sized, and said drive member is positioned, so that substantial relative movement between said axle and said vehicle frame can be accommodated while maintaining said rotational coupling between said crank arm and said axle.

16. The electrical power device according to claim 15 wherein said portion of said drive shaft is nominally in alignment with said axis and said substantial relative movement is about 0.5 inch from said axis.

17. The electrical power device according to claim 16 wherein said drive member is three pairs of opposing drive members, one pair of opposing drive members being disposed between each two adjacent projections.

18. The electrical power device according to claim 16 wherein said drive member includes six drive members, each said opening having a different two of said six drive members associated therewith, thereby forming three pairs of opposing drive members, said members of each pair of opposing members having a space therebetween sufficiently large for loosely receiving said crank arm.

19. The electrical power device according to claim 9 including a spring arranged to urge said drive plate in a direction away from said end of said axle and into engagement with said portion of said drive shaft.

20. The electrical power device according to claim 19 wherein said spring is a compression spring disposed between said drive plate and said axle.

21. The electrical power device according to claim 20 wherein said projection is on an end of said axle and said drive shaft is substantially parallel to and in approximate alignment with said axis.

22. The electrical power device according to claim 21 wherein said drive plate includes an opening into which said projection extends, said drive plate being disposed substantially perpendicular to said axis and said drive member being at right angles to said drive plate.

23. The electrical power device according to claim 22 wherein said drive plate is freely floating between said end of said axle and said crank arm and is retained there solely by the proximity of said drive shaft to said end of said axle and by said projection extending into said opening.

24. The electrical power device according to claim 19 wherein said electrical power device is attached to said vehicle frame and wherein said projection includes three projections equiangularly spaced about said axis, and said drive plate includes three openings, each projection extending into a respective one said opening.

25. The electrical power device according to claim 24 wherein said drive shaft and crank arm are sized, and said drive member is positioned, so that substantial relative movement between said axle and said vehicle frame can be accommodated while maintaining said rotational coupling between said crank arm and said axle.

26. The electrical power device according to claim 25 wherein said portion of said drive shaft is nominally in alignment with said axis and said substantial relative movement is about 0.5 inch from said axis.

27. The electrical power device according to claim 26 wherein said drive member is three pairs of opposing drive members, one pair of opposing drive members being disposed between each two adjacent projections.

* * * * *